July 2, 1968     S. PACILIO     3,390,645
PIZZA DOUGH SPREADER
Filed March 14, 1966     2 Sheets-Sheet 2
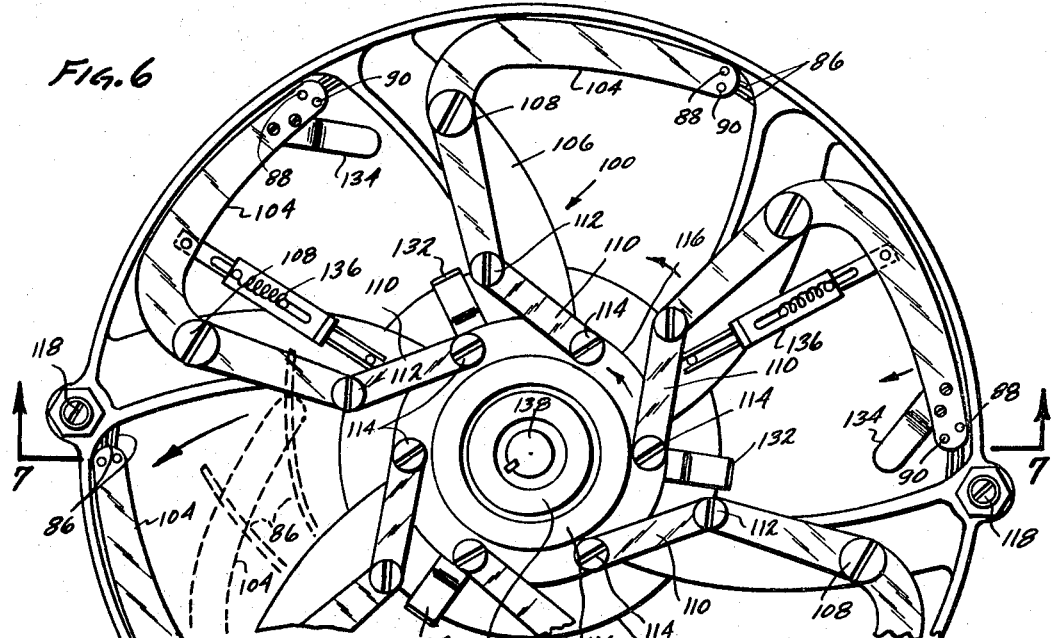
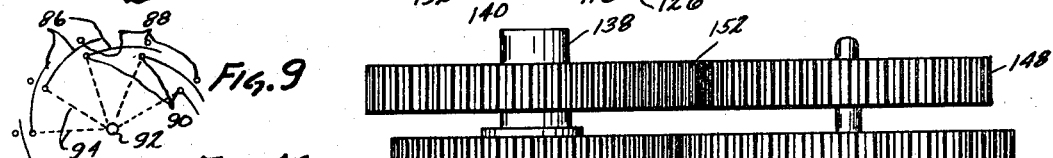
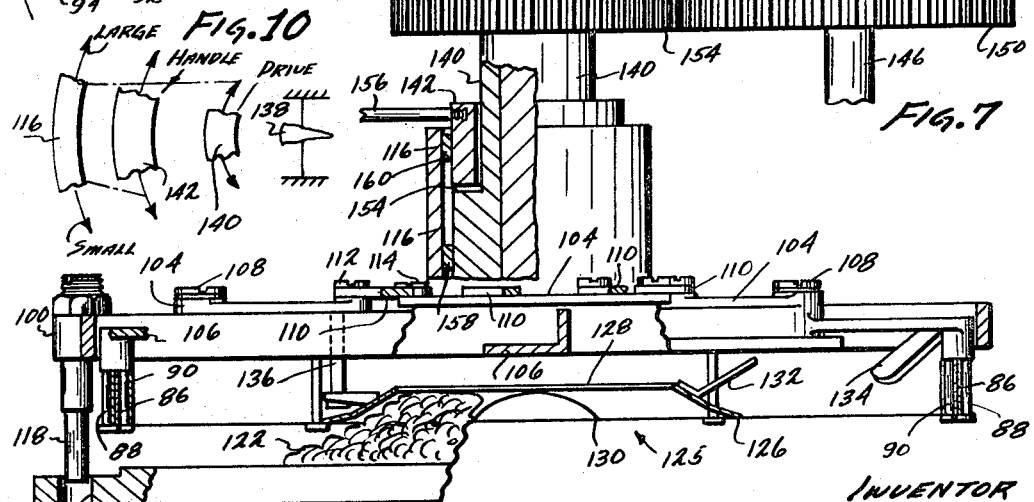
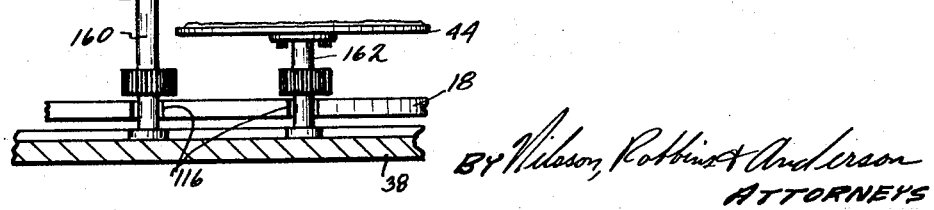
INVENTOR
SALVATORE PACILIO
BY Wilson, Robbins & Anderson
ATTORNEYS

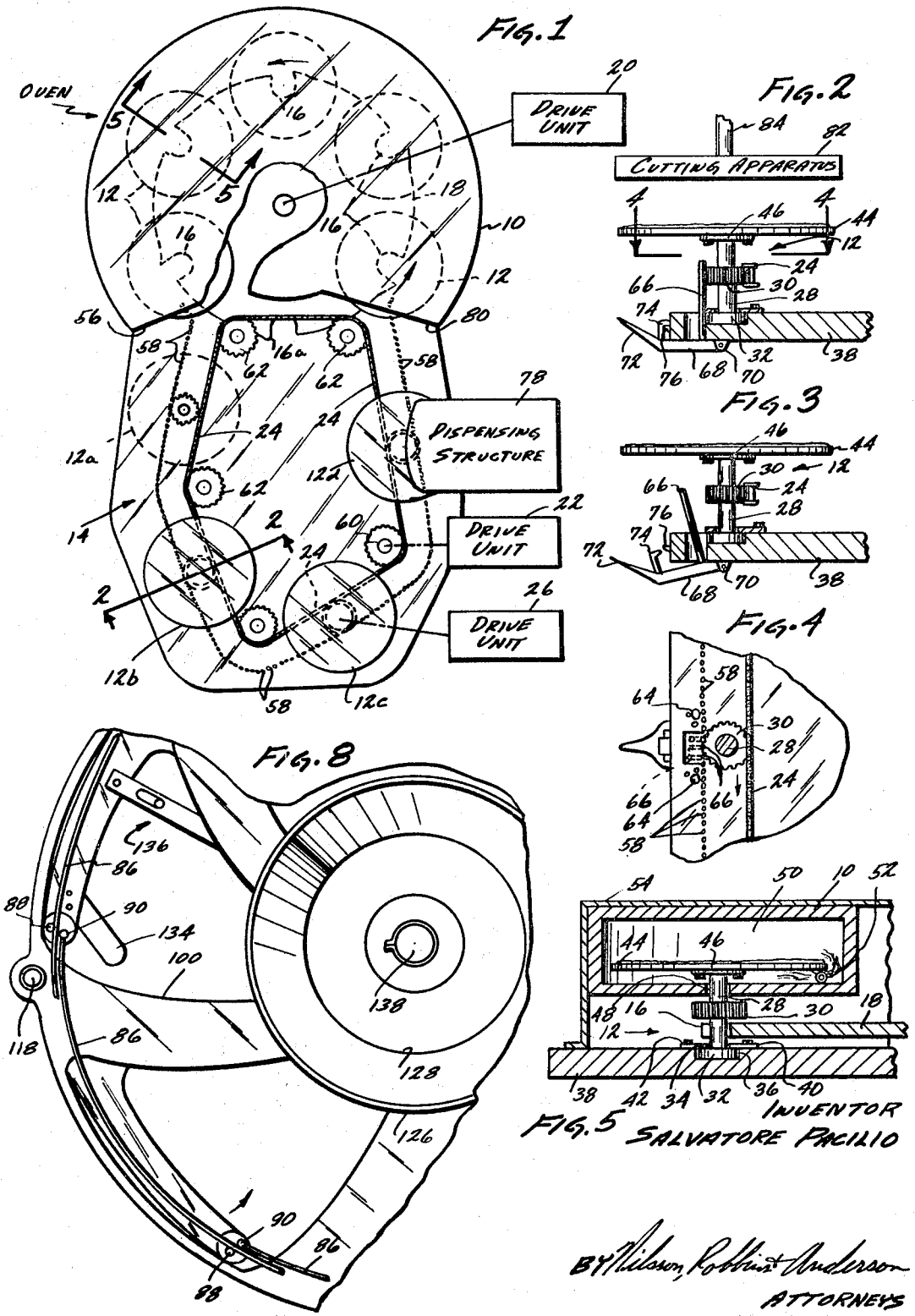

United States Patent Office 3,390,645
Patented July 2, 1968

3,390,645
PIZZA DOUGH SPREADER
Salvatore Pacilio, 10312 "B" Bodger St.,
El Monte, Calif. 91733
Filed Mar. 14, 1966, Ser. No. 541,443
10 Claims. (Cl. 107—1)

ABSTRACT OF THE DISCLOSURE

An improved machine for making Italian pizza is disclosed. Pizza dough blanks are formed by centrifugal force, while supported on a spinning table and confined by a center holding plate and a controlled, expanding circular mechanism including a plurality of arcuate strips. The dough blanks are then topped with various ingredients and carried by a disengageable chain drive through a baking oven. The chain drive incorporates a transport sprocket or gear wheel which is backed by a fixed chain to be propelled by a moving chain.

---

The present invention relates to an improved machine for producing pizza and particularly to such a machine for economical quantity production of quality, traditional pizza.

Traditionally, Italian pizza has been made by hand using a rather delicate technique that requires considerable skill. Specifically, the technique involves repeatedly throwing a piece of dough into the air while simultaneously imparting a spin to the dough so that the centrifugal gyration spreads the air borne dough into a thin disk without pressing or rolling. In view of the time and skill required to produce pizza by this traditional technique, machinery for automatically producing pizza has been developed. Specifically, applicant developed such a machine and was granted United States Patent 2,190,483 thereon on Feb. 13, 1940.

Although such prior machinery represented a vast improvement over the traditional method for commercial production of pizza, some problems continued to exist. For example, until the development of the present invention, a need continued to remain for a fully effective machine for consistently centrifugally forming pizza dough of varying (non-critical) consistency into a disk of substantially uniform thickness, having a regular circular periphery. That is, prior structures have frequently tended to form pizza dough into a somewhat irregular disk, sometimes having thin central portions of insufficient thickness to carry the other ingredients of the pizza, especially when the dough is not of exactly the desired consistency.

In addition to forming the pizza dough disk or pizza blank, prior structures as disclosed in the above-referenced patent have also incorporated a mechanism for placing other ingredients as oil, tomato sauce, spices, cheese, and the like on the dough disk, and for transporting the pizza through a baking environment provided by an oven incorporated in the machine. However, in general, some difficulty has existed in handling the hot pizzas as they exit from such machines. Therefore, a need exists for an improved arrangement whereby a machine operator is subjected to less heat exposure, and is also provided with better facilities for handling pizzas both before baking and after. One further aspect in this regard relates to the additional need invariably present in prior mechanisms for further simplification and economy of construction as well as ease of maintenance.

It is therefore an object of the present invention to provide an improved machine for making pizza, incorporating a plurality of holders for receiving and carrying the pizza ingredients through an oven which forms a part of the machine along with a first drive mechanism for moving the holders through the oven and a second drive mechanism for controlling the holders while outside the oven, the latter functioning in cooperative relationship with a dough-spreading mechanism to effectively produce dough disks as an initial step in the production.

Another object of the present invention is to provide an improved machine for commercially making pizza which machine is economical to manufacture and maintain.

Still another object of the present invention is to provide an improved pizza production machine incorporating somewhat independent drive mechanisms for moving pizza-carrying holders or supports through a baking oven and through a servicing space in which the ingredients of pizzas are applied and removed.

A still further object of the present invention is to provide an improved pizza machine incorporating a baking oven, means for moving pizzas through the baking oven on support structures, and means for moving the support structures through a servicing space which is somewhat removed from the heat of the oven and which is provided for cooperative operation with a centrifugal structure for uniformly spreading pizza dough.

Still a further object of the present invention is to provide an improved mechanism for spreading pizza dough incorporating a plurality of strips supported to define a circle of variable positively-controlled diameter, and further including at least one retaining ring for automatically preserving a predetermined amount of pizza dough at the center of a dough disk.

Other objects and advantages hereof will become apparent from a consideration of the following taken in conjunction with the appended drawings, wherein:

FIGURE 1 is a sectional plan and somewhat diagrammatic representation of a system constructed in accordance with the present invention.

FIGURE 2 is a vertical sectional view taken along line 2—2 of FIGURE 1;

FIGURE 3 is a fragmentary view similar to FIGURE 2 showing the components in a different configuration;

FIGURE 4 is a horizontal sectional view taken along line 4—4 of FIGURE 2;

FIGURE 5 is a vertical sectional view taken along line 5—5 of FIGURE 1;

FIGURE 6 is an enlarged fragmentary plan view of a portion of the structure of FIGURE 1;

FIGURE 7 is a vertical section view taken along line 7—7 of FIGURE 6;

FIGURE 8 is an enlarged fragmentary plan view of a portion of the structure of FIGURE 1;

FIGURE 9 is a diagrammatic view illustrative of the operation of one mechanism of the structure of FIGURE 1;

FIGURE 10 is a diagrammatic view illustrative of the operation of another mechanism of the structure of FIGURE 1; and FIGURE 11 is a fragmentary view similar to FIGURE 5 showing an alternative structural form of one portion of the structure.

Referring initially to FIGURE 1, there is shown an oven 10 through which pizzas are passed during the baking process. Each pizza is carried through the oven 10 on a stand or holder 12, a plurality of which are passing in sequence through the oven 10 at any given time. Of course, the holders 12 may move in either a stepmotion or continuously, so that they emerge from the oven at a time when the pizzas are properly baked.

Upon leaving the oven 10 the holders 12 are transported through an external circuit 14 in which the baked pizza is sliced and removed from a holder 12, then a new pizza is assembled preparatory to baking. That is, a number of stations are provided in the circuit 14 at which various identified operations are performed. Specifically, upon emerging from the oven 10 the holders 12 may be stopped at a delay station shown to be occupied by a holder 12a. Thereafter the holders may move on to a station shown to be occupied by a holder 12b at which the baked pizza is sliced and removed. Next, the holders move to a position or station shown occupied by a holder 12c at which fresh dough is received and the holder is centrifugally spun to spread the dough in the desired disk configuration. This structure is explained in considerable detail below. After formation of the dough into a disk or pizza blank the carrying holder 12 moves to an ingredients station indicated to be occupied by a holder 12d, at which the various topping ingredients are placed on the blank preparatory to the baking operation. Next, the holders move back to the oven to be received in the next-passing detent 16 in a disk 18 and thereby carried through the baking cycle within the oven 10.

In general, the drive for the holders 12 through the external cycle 14 is independent of the movement of the disk 18 which motivates the holders 12 through the oven 10. As a result, independent control is afforded an operator so that time variation can be tolerated in cutting and removing the baked pizza as well as in applying the dough and spinning it into the desired form. Of course, these independent drives may be provided through various gear chains, clutches and the like; however, for illustrative purposes independent drives are disclosed. Specifically a drive unit 20 motivates the disk 18 for moving the pizza holders 12 through the oven 10; a drive unit 22 motivates a gear drive chain 24 for moving the holders 12 through the external circuit 14; and a drive unit 26 motivates a structure for spinning a holder 12 and thereby spreading the dough by centrifugal force.

Considering the movement of the holders 12 through the oven 10, each holder 12 (FIGURE 5) is received in a detent 16 in the disk 18 for circular movement. In this regard, the holders 12 include a vertical shaft 28 having a somewhat-centrally positioned spur gear 30 axially fixed thereon. The lower end 32 of the shaft 28 is enlarged to define a shoulder 34 which mates the end 32 within an annular groove 36 of a support plate 38, upon which the entire structure is held. The groove 36 is partly covered by an internal ring 40 and an external ring 42 both of which are affixed to the support plate 38 to engage the shoulders 34 whereby the holders 12 are held upright in a supported position during movement through the oven 10.

The upper end of the vertical shaft 28 is rotatably affixed to a tray 44 by a rotatable coupling 46. The coupling 46 permits the tray 44 to be rotated at a high speed relative the vertical shaft 28 during the operation of spreading the pizza dough by centrifugal force.

As each pizza moves through the oven 10 (FIGURE 5) on a tray 44, the vertical shaft 28 traverses an annular gap 48 at the bottom of the oven 10, which also defines the annular baking chamber 50. The chamber 50 is heated by a gas burner 52 located contiguous the bottom of the chamber 50 and which may also take an annular form about the oven.

The oven 10 is carried on a frame 54 which is in turn supported on the support plate 38. Normally the support plate 38 is mounted on a pedestal or other support means (not shown) as readily apparent from the prior art, to provide the desired operating level for the entire structure.

Upon exit from the chamber 50 of the oven 10 through an exit port 56 (FIGURE 1) the spur gear 30 (FIGURE 5) is positioned between a stationary or fixed chain 58 (FIGURE 1) and a moving chain 24. The movement of the chain 24 is considerably faster than the movement of the disk 18 so that as the disk 18 gradually brings the teeth of gear 30 into contact with the moving chain 24 an instant of engagement occurs at which the gear 30 is revolved moving the shaft 28 out of the detent 16 with which it has been mated and initiating the movement of the holder 12 through the external circuit 14.

Considering the drive structure of the external circuit 14 in greater detail, the internal moving chain 24 passes over a drive sprocket 60 mechanically coupled to the drive unit 22 as for example by a drive shaft, as indicated by a dash line 62. The chain 24 is also carried on idler sprockets 62 defining the interior pattern of the external circuit 14 in coincidence with the groove 36 formed in the support plate 38 (FIGURE 2). Cooperating with the moving chain 24, the fixed chain 58 simply provides a backup for the spur gear 30 fixed on each of the holders 12. That is, as the gear 30 is engaged by stationary chain 58 and the moving chain 24 on opposed sides, it is forced to traverse the external circuit 14 as a result of rotation by the moving chain 24 and meshing reference engagement with the stationary or fixed chain 58. At each of the stations provided along the path of the external circuit 14 at which the holders 12 can be stopped, a device is provided for disengaging the gear 30 from the stationary chain and thereby halting forward movement of the holder 12.

As shown in FIGURE 4, the stationary chain 58 extends between posts 64 (affixed to the support plate 38) which abut each of the stations identified with respect to FIGURE 1. In the space between adjacent of the posts 64 the stationary chains are continued by vertical pins 66 (FIGURE 4) which are fixed into a common base for gang movement into and out of cooperative continuous relationship with the stationary chain 58. As shown in FIGURE 4, the pins 66 are in line with the pins of the chain 58 and therefore provide continuous backup for the spur gear 30. Thus, as the chain 24 moves through the external circuit 14, the spur gear 30 is revolved so as to traverse over the pins 66 as well as the independent pins of the chains 58. However, if the pins 66 are withdrawn from continuous alignment with the pins in the chain 58, the spur gear 30 stops at a location contiguous to the pins 66, simply revolving in a fixed position as it is driven by the chain 24.

The movement of the pins 66 into an out of engaging positions is illustrated in FIGURES 2 and 3 wherein FIGURE 2 discloses the pins 66 in an operative aligned position while FIGURE 3 indicates the pins 66 withdrawn to halt forward motion of the holder 12. The pins 66 are affixed to extend vertically from a transverse carrier 68 the internal end of which is affixed to the bottom of the support plate 38 by a pivot mount 70. The carrier 68 extends outward from the support plate 38 terminating in a handle 72 usable for manually engaging and disengaging the pins 66. Substantially between the transverse carrier 68 and the handle 72, there is a latch 74 of spring metal for locking engagement with a catch 76 to hold the pins 66 in an upright, operative gear-engaging position.

The disengageable pin structures as described above are provided at each of the stations shown occupied by the holders 12a, 12b, 12c and 12d in FIGURE 1. Therefore, a holder may be conveniently and easily stopped in each of these locations either for purposes of convenience or to perform a production operation simply by pushing the handle 72 down to withdraw the pins 66.

Insofar as the overall operation of the system is concerned a detailed appreciation thereof may now best be accomplished by assuming an initial stage therein and explaining the following sequence of production events somewhat simultaneously with the introduction of further detailed structure. Therefore, initially assume the presence of an empty tray 44 at the location occupied by the holder 12b upon which a pizza is to be formed. Initially a quantity of pizza dough is placed on the tray and the holder 12b is then engaged to the chain drive for movement to the station indicated to be occupied by the holder 12c. At that location, the tray of the holder 12 is revolved at a relatively high rate to spread the dough in a substantially uniform and controlled manner. The details of the structure for accomplishing this operation are considered below with reference to FIGURES 6, 7, 8, 9 and 10; however, for purpose of the present explanation assume the accomplishment of a desired pizza blank or circular dough sheet on a tray 44 which is next moved by the chain 24 to the station indicated to be occupied by the holder 12d. At that station, the various topping ingredients are applied to pizza blank by a dispensing structure 78 which may be variously constructed as for example disclosed in the above-referenced Patent 2,190,483. Of course, various other arrangements may also be incorporated in the dispensing structure 78 for providing the topping ingredients as oil, cheese, tomato paste, spices, as well as various other ingredients.

Upon completion of the pizza, e.g. assembly of the unbaked ingredients, the gear of the holder 12d is manually engaged with the chain 24 for movement to a position adjacent the revolving disk 18 at the entry port 80 to the oven 10. Upon contact of the disk 18 with the vertical shaft 28 of the holder, the chain 58 terminates so that the spur gear 30 simply revolves with the holder 12 stationary, pending the arrival of the next detent 16 in the disk 18.

When the next detent 16 arrives at the entry port 80, the vertical shaft 28 of the holder 12 is caught by a slight extension 16a from the detent moving the holder 12 into the annular portion of the groove 36 in the support plate 38 for transfer through the oven 10 as shown in FIGURE 5. It is to be noted that as the wheel or disk 18 moves slowly through its cycle, the guidance provided by the groove 36 in the support plate 38 gradually moves the vertical shaft 28 of the holder 12 into substantially full contact with the mating detent 16.

As the holder 16 moves through the annular baking chamber 50 (FIGURE 5) of the oven 10, the pizza is baked in timed relationship between the movement of the drive disk 18 and the intensity of the heat provided from the gas burner 52. As a result, when the holder 12 carrying the pizza described reaches the exit port 56 in sequence, the gear 30 moves to mesh with the chains 58 and 24 which withdraw the vertical shaft 28 from the detent 16 and initiate the movement of the holder 12 through the external circuit 14.

Upon reaching the station indicated to be occupied by the holder 12a, the vertical pins (FIGURES 2 and 3) may be disengaged to cause the holder 12 carrying a fresh pizza, to wait momentarily at that station pending the time when the pizza can conveniently be sliced and dispensed. At that time, the pins 66 (FIGURE 2) are again raised by lifting the handle 72 causing the holder 12 to move on to the station indicated to be occupied by the holder 12b (FIGURE 1). At that station, a cutting apparatus 82 (FIGURE 2) incorporating knives or other cutting devices and carried on a vertically movable shaft 84 is lowered to a position contiguous the tray 44 to slice the pizza into a number of segments, e.g. six individual sections. Thereafter, the pizza is removed from the tray 44 to be served for consumption.

While the tray 44 is at the station indicated to be occupied by the holder 12b, the tray may be wiped off or otherwise cleansed and another quantity of pizza dough applied thereto. Next, the handle 72 (FIGURE 2) is raised to lock the latch 74 with the catch 76 holding the vertical pins 66 upright in engagement with the gear 30 thereby causing the gear to traverse over the pins 66 and return to the location indicated to be occupied by the holder 12c at which the holder is again revolved to spread the dough into a pizza blank. The structure for accomplishing controlled formation of the pizza blank will now be considered.

An important aspect of forming the pizza blank should be understood to reside in the fact that the dough spreading structure accomplishes the dough blank by centrifugal force while exercising positive control. In general, this is accomplished by placing the dough on a tray which is then revolved at a high rate of speed, causing the dough to spread while positively restricting the flow of the dough to form a circular pizza blank. In this regard, it is important that an expandable ring contain the dough in a circular form throughout its spreading; and also that the ring be positively controlled to contain the rate at which the dough may spread. It is also sometimes desirable to provide a retainer for central dough.

Preliminary to considering the detained structure of the dough spreader, reference will first be made to the diagrammatic representation in FIGURE 9 illustrative of the manner in which the positively-controlled expanding circle or dough-containing ring is provided. A number of strips 86 of flexible sheet metal are represented in FIGURE 9. One end of each of the strips is rigidly affixed to a pin 88 which is spaced apart from a pin 90 to provide a slot therebetween that receives the free end of a strip 86. The pins 88 and 90, carrying the strips 86 are movably mounted for various radial displacements from a center 92 so that the length of the radial lines 94 as indicated, may vary. Therefore, when the pins 88 and 90 are placed in close proximity to the center 92, i.e. the lines 94 are short, the developed circle defined by the strips 86 is small. However, as the pins 88 and 90 move away from the center 92, the overlapped strips 86 withdraw from the slots between the pins defining an expanded circular or ring configuration. In this manner, the pizza dough is initially confined within a relatively small ring and thereafter simultaneously with the spreading of the dough, the ring is controlled by a positive coupling which withdraws the pins 88 and 90 from the center 92.

The motion for driving the pins 88 and 90 inwardly or outwardly in relation to the center structure 92 is accomplished by a rotary arrangement of spaced apart levers as shown in FIGURES 6 and 8. Specifically, FIG-6 is a top plan view of the dough-containing structure while FIGURE 8 is a bottom plan view of the same structure. The unitary frame 100 of the structure is substantially a rigid wheel-like member upon which the various moving parts are carried. Extending from the bottom of the member 100 are the spaced-apart pairs of pins 88 and 90 (FIGURE 8) affixed together to define a slot therebetween which receives the free end of a strip 86. As indicated, the fixed end of each of the strips 86 is attached to one of the pins 90.

The pins 88 and 90 are carried on interconnected arcuate arms 104 (FIGURE 6) pivotally affixed to spokes 106 of the frame 100 by threadably engaged studs 108. The pivotal displacement of the arms 104 about the studs 108 positions the pins 88 and 90 at various radial distances from the center of the frame 100. This displacement is accomplished through a group of straight links 110 connected by studs 112 to the internal ends of each of the arms 100 to provide a pivotal coupling. The other end (internal) of the link 110 is pivotally connected to a stud 114 to an annular hub 116 which is rotatably mounted relative the frame 100 as described below.

As the hub 116 revolves relative the wheel or frame 100, the links 110 pivotally swing the arms 104 about the studs 108 radially moving the free ends of these arms 104 which carry the pins 88 and 90. In this manner, the pins are positioned at various radial displacements to place the strips 86 to define a ring of varying diameter.

In the operation of the dough-spreading structure, the wheel or frame 100 is revolved at a relatively high rate and is coupled to concurrently revolve a tray 44 carrying pizza dough. Specifically, the frame 100 (FIGURE 7) is lowered over a tray 44 so that diametrically-opposed, threadably-affixed studs 118, extending downward from the circular spreading structure engage the tray through mating bores 120. Therefore, dough 122 carried on the tray 44 is revolved at a high rate to develop centrifugal forces which spread the dough somewhat uniformly over the tray 44 into a disk or circular configuration. In this regard, the action of the strips 86 controlling the dough is supplemented by a central structure 125 (FIGURE 7) which is lowered somewhat in synchronism with the expansive motion of the strips 86 to retain the central portion of the pizza blank during the centrifugal development. That is, it has been determined that in centrifugally forming a pizza blank of dough (depending upon speed, dough consistency and the like) thin spots may develop at the center of the pizza blank. To avoid the development of such thin spots the present invention may incorporate the central retaining structure 125 including an annular lip 126 supported on a circular sheet 128 which also supports an internal annular lip 130 concentric to the lip 126. The central structure 125 is lowered as the strips 86 move to define an expanding circle and is raised when the strips move in a contracting manner. This movement is accomplished by mating tabs 132 and 134 (FIGURE 6) in cooperation with guide locks 136 which assist in holding the central structure 125 elevated until a circle of predetermined diameter has been defined. That is, the co-acting cam surfaces of the tabs 132 and 134 raise the central structure 125 upon collapse of the strips 86. Then on expansion of the strips 86 the tabs 132 and 134 are disengaged. However, the central structure 125 remains elevated until the guide locks 136 are sufficiently withdrawn to permit gravity dropping of the central structure.

In the operation of the system, the rotational movement of the hub 116 (FIGURE 6) relative the frame 100 either causes an expanding or contracting operation of the dough-confining mechanism. However, this relative motion must be imparted to the hub while the entire structure is revolving at a relatively high speed. Conversely, the return of the elements preparatory to preparing another pizza blank is normally performed while the structure is standing still immediately before placing the dough 122 and starting the revolutionary movement.

Preliminary to considering an exemplary structure for driving the rotary structure, and imparting relative motion to the hub 114 reference will be made to a diagrammatic representation of FIGURE 10. There are shown segments of several concentric shafts. The central shaft 138 is indicated to be fixed; however, it is to be understood that the shaft 138 is effectively fixed to the frame 100 which does revolve. Exterior of the shaft 138 is a hollow shaft 140 which in turn receives another shaft 142 outside of which is the hub 116.

Assuming the rotation of all these shafts, as a stationary condition, is helpful in considering the relative motion between the elements. In this regard, the shaft 140 is clutch-coupled to the hub 116 when revolved in a clockwise direction; however, it is substantially disengaged from the hub 116 when revolved in a counterclockwise direction. In a somewhat similar manner, the shaft 142 is coupled to the hub 116 for movement only for counterclockwise motion. These couplings are accomplished by any of a variety of well known structures, as gravity-pawl clutches that run free in one direction and grip instantly in the other direction. Therefore, drive imparted to the shaft 140 relative the central shaft 138 spreads the strips 86 defining the ring while motion of the shaft 142 as by a manual handle returns the strips to a confining position.

In view of this preliminary description, reference will now be had to FIGURE 7 for a detailed analysis of an exemplary form of drive. However, it is to be clearly understood that various other forms of the drive may be provided and the drive illustrated in FIGURE 7 is only representative to disclose the manner in which the apparatus functions.

Rotary motion for the pizza dough-spreading structure is applied to a shaft 146 which carries a pair of axially-aligned spur gears 148 and 150. The spur gear 148 is of slightly smaller diameter than the spur gear 150 and meshes with a gear wheel 152, axially aligned with a gear wheel 154 which meshes with the gear wheel 150. The gear wheel 152 is affixed to the internal shaft 138 while the lower gear wheel 154 is affixed to the concentric shaft 140. The shaft 140 is formed to define a shoulder 154 which abuts the shaft 142 that receives a radially-extending handle 156. Exterior of the shafts 140 and 142 is the hub 116.

In the operation of this system, rotation of the shaft 140 in a clockwise direction is coupled to the hub 116 through a gravity-pawl clutch 158. Conversely, counterclockwise motion of the shaft 142 is coupled through a gravity-pawl clutch 160 to the hub 116. Of course, motion by either of the shafts 140 or 142 in the opposite direction is essentially free running. Therefore the strips 86 are moved outward during the spinning operation and may be easily manually returned thereafter. Of course, various forms of rollers and gravity-pawl clutches are well known in the prior art which run free in one direction and grip instantly in the other direction. Specifically, a number of different forms of such clutches are shown and described beginning on page 146 of a book entitled "Engineers Illustrated Thesaurus," published 1952 by Chemical Publishing Company, New York, N.Y., authored by Herbert Herkimer.

In view of the above description of the dough-spreading structure a complete understanding of the operation hereof may now best be accomplished by assuming a dough-spreading operation is to be performed and pursuing the sequence of events along with introduction of further structural description. Therefore, assume initially that a quantity of pizza dough 122 (FIGURE 7) has been placed on the tray 44 preparatory to developing a pizza blank. Next, the lever or handle 156 is moved in a counterclockwise direction turning the hub 116 (FIGURE 6) counterclockwise from the position shown so as to pivotally move the arms 104 inwardly and thereby draw the pins 88 and 90 at the end thereof into a tight circle defined by the strips 86. Simultaneously, the tab 134 engages the tab 132 and raises the central structure 125 from the position as shown in FIGURE 7.

Next, the shaft 146 is coupled to a source of rotary motion to drive the shafts 138 and 140 at different speeds. That is, it is to be noted, that the shaft 138 is integral with the major frame 110 of the spreader and therefore revolves the frame at an established speed or rate. However, the gear 150 drives the gear wheel 154 at a slightly different speed as a result of differential gearing so as to impart a relative motion to the shaft 140 in a clockwise direction related to the center shaft 138. That relative motion is then imparted through the clutch 158 to the hub 116 which is revolved to move the links 110 (FIGURE 6) to in turn pivotally swing the arms 104 so that the pins 88 and 90 move out defining a circle of increasing diameter as defined by the strips 86. Thus, the pizza blank is developed. It is to be noted, that at a certain stage in the development of the pizza blank the central structure 125 is gravity lowered on the central portion of the pizza to retain a quantity of dough, and avoid thin spots which might otherwise be inadequate to support various topping ingredients.

At the conclusion of the spinning operation which might be sensed by switching means, manual observation or otherwise, the shaft 146 is disengaged so that the structure dissipates its rotary energy and is lifted from the tray 44 disengaging the pins or studs 118 from the bores 120 leaving a developed pizza blank on the tray 44 ready to receive topping ingredients. Thus, the system is capable of rapidly engaging the trays 44 to simply and easily form a pizza of dough in an operation which requires little skill or technique yet which accomplishes the pizza without rolling or pressing the dough.

It is to be noted, that in the transporting the pizzas through the oven 10 after the blanks have been formed and the topping ingredients applied, some conservation of space can be accomplished if desired by an alternative arrangement which staggers the levels of the trays 44 as shown in FIGURE 9. That is, by providing shafts 160 and 162 of alternate staggered length, the rotary disk 18 may be formed to engage the holders in closer relationship whereby conserving space within the oven.

The system hereof may be variously manufactured; however, in general, conventional machine and casting techniques are applicable. In addition to the detailed structure disclosed herein the system will include various power trains and motive means which of course are readily available in the prior art and are therefore not described in detail herein.

What is claimed is:

1. A pizza making machine for making pizza of dough and other ingredients comprising:
   a plurality of holders for receiving said pizza ingredients;
   an oven for baking said ingredients into a pizza and having an entry location and an exit location;
   a first drive mechaism to independently engage said holders for moving said holders in sequence through said oven at a controlled speed;
   a second drive mechanism to independently engage said holders for moving said holders in sequence from said exit location of said oven to said entry location of said oven at a speed different from said controlled speed and means for coupling to said holders at one of said predetermined locations whereby to revolve said holders to impart centrifugal forces to the ingredients thereon and means to control the displacement of said ingredients thereon.

2. A machine according to claim 1 wherein said means to control comprises:
   a dough containing means for controlling the spreading of dough, including a plurality of guides to define a circle of variable diameter, and a plurality of flexible strips, each having one end affixed at one of said guides and extending to be slidably received in an adjacent guide whereby to define a variable-diameter annular rim.

3. A machine according to claim 1 wherein said means to control comprises:
   at least one annular retaining ring fixed to be lowered toward said support to engage a central portion of said dough against further displacement by centrifugal forces.

4. A machine according to claim 1 wherein said means to control comprises:
   a dough containing means for controlling the spreading of said dough, including a plurality of guides to define a circle of variable diameter, and a plurality of flexible strips, each having one end affixed at one of said guides and extending to be slidably received in an adjacent guide whereby to define a variable-diameter annular rim;
   at least one annular retaining ring fixed to be lowered toward said support to engage a central portion of said dough against further displacement by centrifugal forces.

5. A machine according to claim 1 wherein said first drive mechanism comprises a circular disk defining spaced-apart detents for receiving said holders and movable to displace said holders through said oven.

6. A pizza making machine for making pizza of dough and other ingredients, comprising:
   a plurality of holders for receiving said pizza ingredients;
   an oven for baking said ingredients into a pizza and having an entry location and a exit location;
   a first drive mechanism to independently engage said holders for moving said holders in sequence through said oven at a controlled speed;
   a second drive mechanism to independently engage said holders for moving said holders in sequence from said exit location of said oven to said entry location of said oven at a speed different from said controlled speed;
   and wherein said second drive mechanism includes movable chain means and said holders include sprocket means engageable with said chain means for displacement.

7. A machine according to claim 6 further including rack means for engaging said sprocket means in cooperation with said chain means.

8. A machine according to claim 7 further including means for withdrawing at least one segment of said rack means whereby to stop said holders at a predetermined location.

9. An applicance for spreading dough as in making pizza, comprising:
   a support for receiving and supporting a portion of said dough;
   means for rotatively driving said suport to centrifugally spread said portion of said dough; and
   a dough containing means for controlling the spreading of said dough, including a plurality of guides to define a circle of variable diameter, and a plurality of flexible strips, each having one end affixed at one of said guides and extending to be slidably received in an adjacent guide whereby to define a variable-diameter annular rim.

10. An appliance according to claim 9 further including:
    at least one annular retaining ring fixed to be lowered toward said support to engage a central portion of said dough against further displacement by centrifugal forces.

References Cited

UNITED STATES PATENTS

| | | | |
|---|---|---|---|
| 2,066,283 | 12/1936 | Wadman | 15—304 XR |
| 2,190,483 | 2/1940 | Pacilio. | |
| 2,639,828 | 5/1953 | Otte | 214—308 |
| 3,294,037 | 12/1966 | Hoag et al. | |

FOREIGN PATENTS

| | | |
|---|---|---|
| 249,681 | 8/1926 | Italy. |

WALTER A. SCHEEL, *Primary Examiner.*

A. O. HENDERSON, *Assistant Examiner.*